L. F. DOEN

July 26, 1932. VALVE Re. 18,540

Original Filed July 20, 1926

INVENTOR

Loran F. Doen

Reissued July 26, 1932 Re. 18,540

UNITED STATES PATENT OFFICE

LORAN F. DOEN, OF CLEVELAND, OHIO, ASSIGNOR TO THE CLEVELAND HEATER COMPANY, OF CLEVELAND, OHIO, A CORPORATION OF OHIO

VALVE

Original No. 1,759,891, dated May 27, 1930, Serial No. 123,690, filed July 20, 1926. Application for reissue filed January 15, 1932. Serial No. 587,079.

This invention relates to gas appliances and in particular a fuel control accessory and valve for use in connection therewith.

The object of this invention is to provide an improved gas valve and spud holder with means forming a part of the valve for connecting the Bunsen tube of a gas burner to the gas supply line so that the gas conduit may be readily separated and closed at the valve for removal of the burner and other purposes.

These and other objects will appear from the following detailed description and appended claims.

In the accompanying drawings forming a part of this specification are illustrated embodiments of the features of this invention in which.

Figure 1:
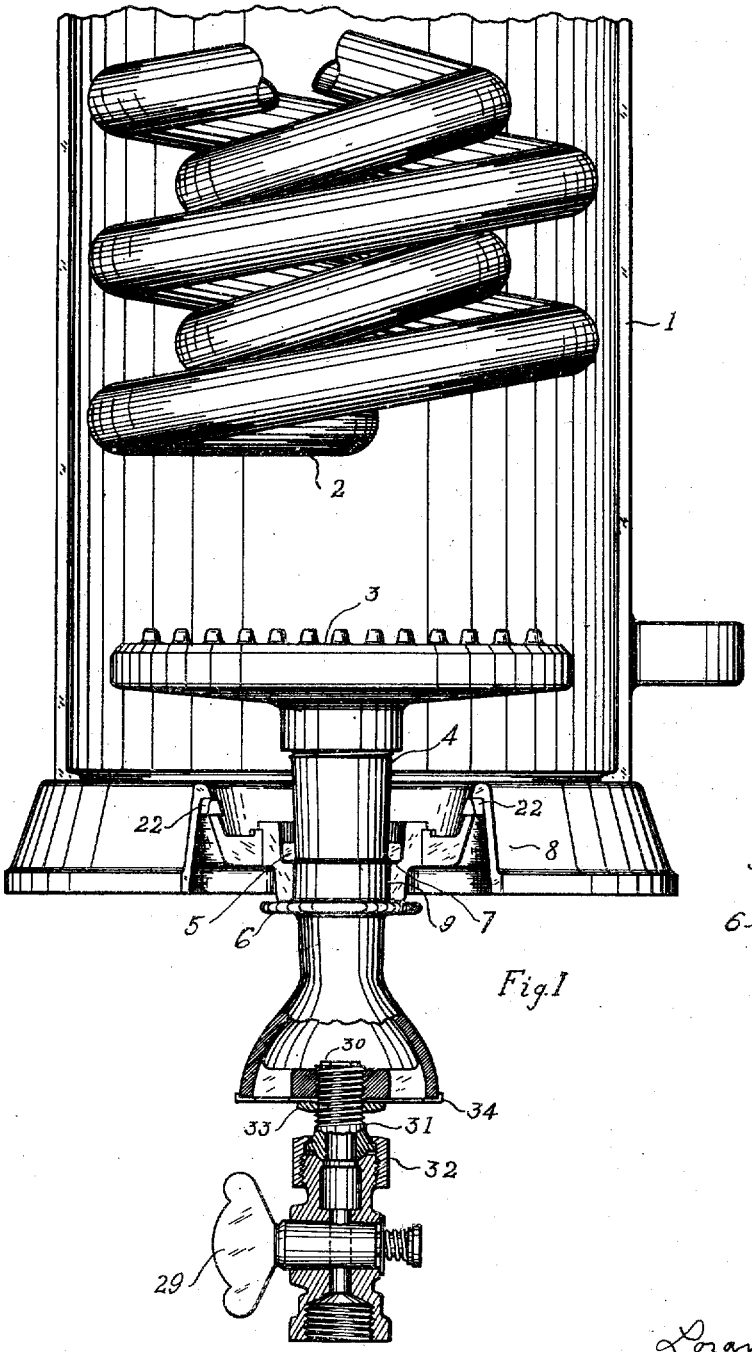
Figure 1 is a front elevational view partly in section of a water heater illustrating a gas appliance which is adapted for use of my improved valve.
Figure 2:
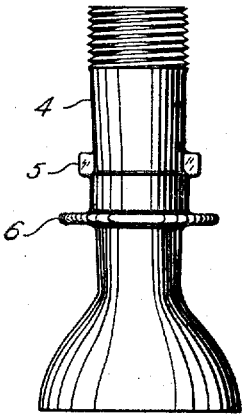
Figure 2 is a front elevational view of the gas and air mixing tube of the burner shown in Fig. 1.

Referring to Figure 1, the numeral 1 designates the casing of a heater having a heating coil 2 adapted to be connected at its extremities in the usual manner to the top and bottom of a boiler, so that there is a circulation of water through the coil and boiler when the burner is in operation. The burner 3 is mounted on a Bunsen or mixing tube 4 by means of a threaded joint.

The means comprising projecting lugs 5 and a collar 6 forming an integral part of the Bunsen tube cooperate with helical projections or ledges 7 in a central aperture 9 of the base 8 to securely and detachably hold the Bunsen tube in position in the heater base. A pair of diametrically opposed vertical slots (not shown) are provided in the base for reception of the lugs 5 to permit the insertion and removal of the Bunsen tube in the assembled heater base.

The heater base 8 is made in two pieces comprising the fixed element shown, and a removable element (not shown) that is adapted to engage the lugs 22 and fill in the cut-out portion of the base providing a base that permits the ready installation or removal of the assembled burner and mixing tube. The base itself forms the subject matter of copending applications Serial Numbers 271,762 and 271,795 of Walter W. Ziegler and Edmund J. Te Pas respectively. The subject matter of this invention is confined to the gas valve certain modifications of which are shown and specifically claimed in my copending applications Serial Nos. 184,141 and 184,142.

The above-mentioned applications have resulted, respectively, in the following patents: Patent No. 1,830,866, issued November 10, 1931, Patent No. 1,843,936, issued February 9, 1932, Patent No. 1,759,892, issued May 27, 1930, and Patent No. 1,759,893, issued May 27, 1930.

As a further means of facilitating the removal and replacement of the burner assembly, a combined union and spud holder is screwed into the lower end of the Bunsen tube. The lower end of the union carries a gas cock 29 to control the flow of gas from a main fuel feed line to the burner. The flanged element 31 of the union is held from turning in the Bunsen tube by a locknut 33 which also serves to lock the air shutter 34 in position. A gas spud 30 is removably secured within the flanged element 31 of the combined union and spud holder. The nut 32 serves to hold the union together, and upon loosening it the Bunsen tube is quickly disconnected from the gas line permitting the removal of the Bunsen tube with its associated burner from the heater base in the manner described.

Furthermore, it is to be understood that the particular forms of apparatus shown and described, and the particular procedure set forth, are presented for purposes of explanation and illustration and that the various modifications of said apparatus and procedure can be made without departing from my invention as defined in the appended claims:

I claim:

1. A gas appliance accessory comprising a manually operable cock having a valve body externally threaded at one end forming the female portion of the union connection, a combined union and spud holder forming the male portion of the union connection adapted to be detachably secured to the externally threaded portion of said valve body, and a gas spud carried in said spud holder.

2. A gas appliance accessory comprising a gas cock having an integrally formed body with a passageway therethrough and having a threaded portion adapted to form one element of the union connection, means to control fluid flow through said passageway, a nipple adapted to form the other element of the union connection, a union nut for detachably connecting said nipple to the threaded portion of said body, and a gas spud carried in said nipple, said body and nipple being adapted for securement to a gas supply line and to a gas burner, respectively.

3. In a construction of the character described, the combination with a burner and mixer member adapted for mounting in a water heater or like device, of a union cock therefor, comprising a valve body threaded at one end for connection to a gas supply pipe and provided with a shut off valve member, a nozzle member adapted to enter an opening in the burner mixer, and a union connection between said nozzle member and valve body.

4. In a gas appliance accessory, the combination of a gas control valve and a flow regulating device detachably secured to each other and fixedly secured to a gas supply line and to a gas burner respectively, said gas control valve comprising an integrally formed body with a passageway and means to control fluid flow therethrough and having a portion forming one element of a union connection, said regulating device forming the other element of the union connection and having a restricted central bore or passageway for effecting the entrainment of air and the injection of gas into the gas burner, and a union nut for detachably securing said valve and device to each other.

In testimony whereof I affix my signature.

LORAN F. DOEN.